Patented Feb. 7, 1928.

1,658,122

UNITED STATES PATENT OFFICE.

HEINRICH GÜNZLER AND OSKAR NEUBERT, OF ELBERFELD, GERMANY, ASSIGNORS TO WINTHROP CHEMICAL COMPANY, INC., OF NEW YORK, N. Y.

TABLET.

No Drawing. Application filed May 11, 1925, Serial No. 29,618, and in Germany May 22, 1924.

Our invention relates to the manufacture of tablets which are quickly soluble in water. They are obtained by preparing such tablets by means of products which are soluble in water with the addition of acetamid with or without the addition of dehydrating agents e. g. dried sodium sulfate, dried disodium phosphate etc. These new tablets are more quickly soluble in water than tablets which are prepared from the therapeutically valuable bodies alone or with other suitable additions e. g. sugar, common salt etc. In addition it is pointed out that acetamid is not poisonous and has an agreeable taste. As it is somewhat hygroscopic it is suitable to add a dehydrating agent as above stated.

In order to illustrate our invention more fully, we give the following examples:—

*Example 1.*—50 parts by weight of the sodium salt of diethylbarbituric acid (veronal) are mixed with 27 parts by weight of acetamid and 3 parts by weight of dry disodium phosphate. From this mixture 0.8 gram tablets are made. They are clearly soluble in water during 2 minutes.

*Example 2.*—50 parts by weight of protein silver (U. S. Letters Patent No. 615,970) are mixed together with 63 parts by weight of acetamid and 7 parts by weight of dried sodium sulfate. From this mixture 0.6 gram tablets are prepared. They dissolve in water during one minute furnishing a limpid solution.

*Example 3.*—80 parts by weight of sodium bicarbonate are mixed with 15 parts by weight of acetamid. From this mixture 0.45 gram tablets are made. These tablets are soluble in water much more quickly as such produced of pure sodium bicarbonate.

*Example 4.*—50 parts by weight of antipyrine are mixed with 30 parts by weight of acetamid. From this mixture 0.8 gram tablets are made, being quickly soluble in water.

*Example 5.*—30 parts by weight of sodium salt of ethylphenyl barbituric acid are mixed with 15 parts by weight of acetamid. From this mixture 0.45 gram tablets are made, which are very quickly soluble in water.

*Example 6.*—Tablets which are easily soluble in water can be obtained by mixing 50 parts by weight of dimethylpiperazine tartrate with 50 parts by weight of acetamid.

We claim:—

1. As an article of manufacture, a tablet, said tablet being a compressed mixture comprising a finely divided water-soluble material and finely divided acetamid.

2. As an article of manufacture, a tablet, said tablet being a compressed mixture comprising a finely divided water-soluble material, finely divided acetamid, and a finely divided solid dehydrating agent.

In testimony whereof we have hereunto set our hands.

HEINRICH GÜNZLER.
OSKAR NEUBERT.